Oct. 10, 1933.  A. MUSZYNSKI ET AL  1,930,179
OIL BURNING APPARATUS
Filed Aug. 24, 1932   2 Sheets-Sheet 1
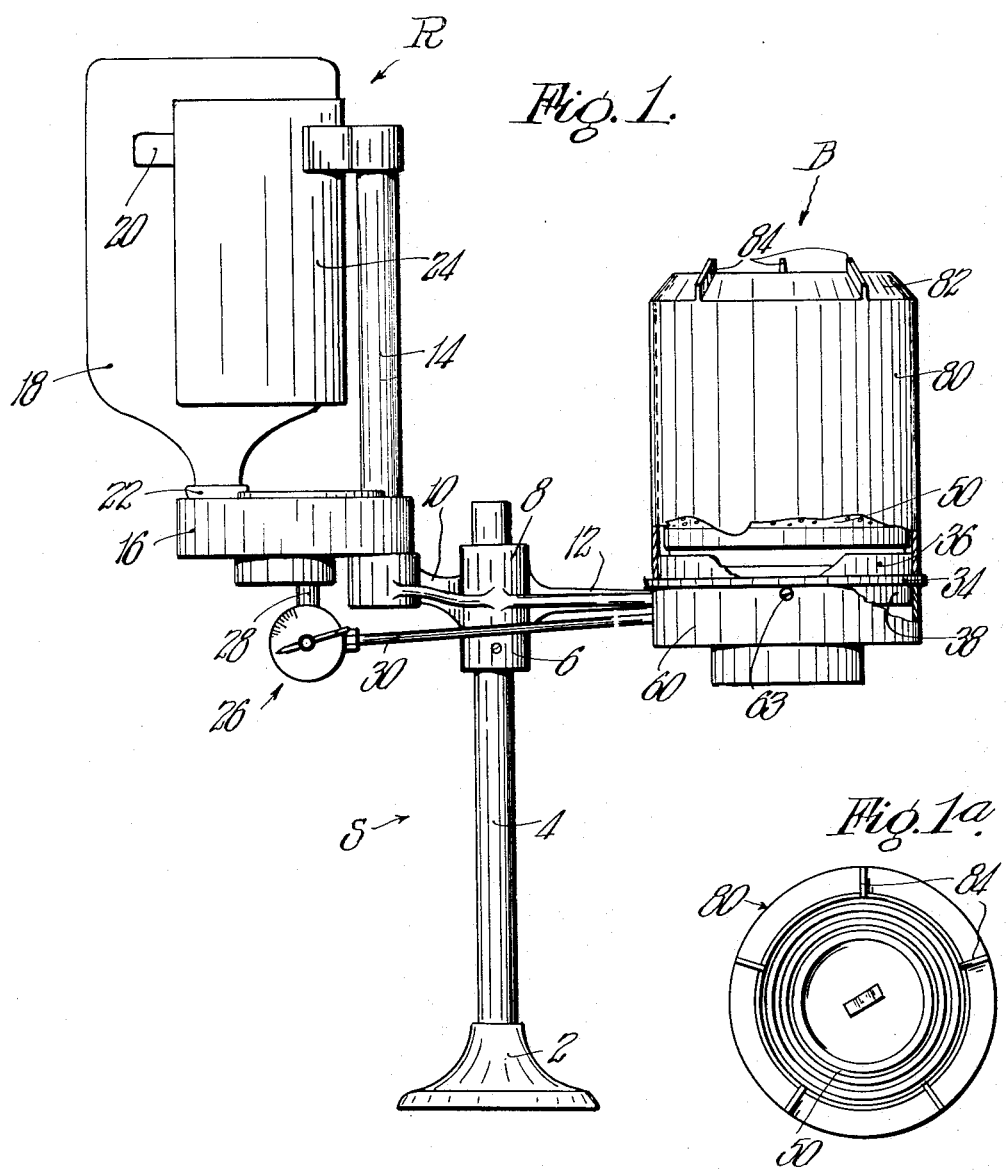
INVENTORS
Antoni Muszynski & Stefan Rapalus
BY Walter C. Ross
their ATTORNEY Oct. 10, 1933.  A. MUSZYNSKI ET AL  1,930,179
OIL BURNING APPARATUS
Filed Aug. 24, 1932   2 Sheets-Sheet 2
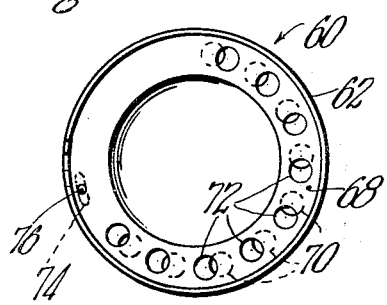
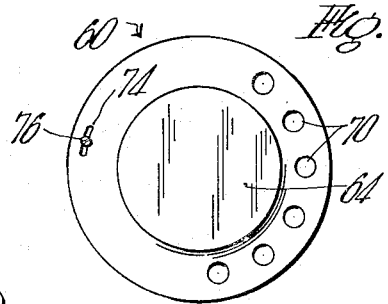
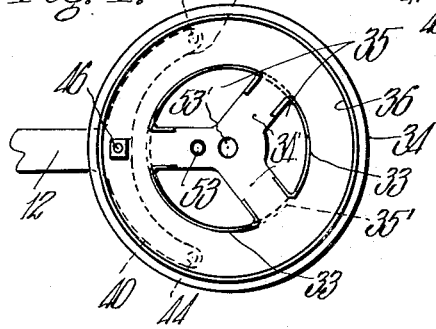
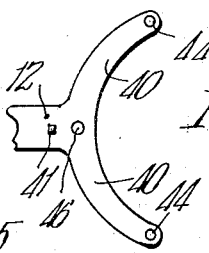
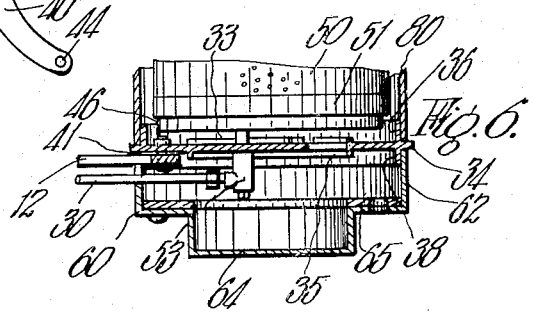
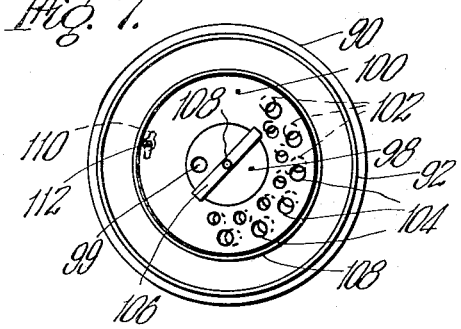
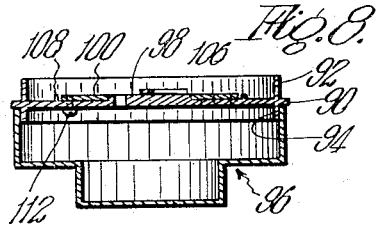
INVENTORS
Antoni Muszynski & Stefan Rapalus
BY Walter C. Ron
their ATTORNEY Patented Oct. 10, 1933

1,930,179

UNITED STATES PATENT OFFICE 1,930,179

OIL BURNING APPARATUS

Antoni Muszynski and Stefan Rapalus, Easthampton, Mass.

Application August 24, 1932. Serial No. 630,188

8 Claims. (Cl. 158—86)

This invention relates to improvements in oil burner apparatus and is directed more particularly to improvements in oil burner apparatus of the gravity flow type.

The principal objects of the invention are directed to an apparatus of the type referred to which has as one special feature, an open ended shell embracing the burner unit which is adapted to support various objects such as cooking utensils or the like which it is desired to heat. The said shell is supported in such a way on a movable member that the shell enclosing the burner may be located beneath a water heating unit or the like of a hot water system.

Another object of the invention is the provision of an adjustable air inlet mechanism for controlling the air supply to the burner to obtain the desired combustion. The objects of the invention are accomplished by the provision of a novel combination and arrangement of parts hereinafter fully described.

Various other novel features and advantages of the invention will be more fully hereinafter referred to in connection with the accompanying description of the preferred form thereof which for purposes of disclosure is illustrated in the accompanying drawings wherein;

Fig. 1 is a side elevational view of an oil burner apparatus embodying the novel features of the invention with parts broken away for clearness.

Fig. 1a is a plan view of the shell unit of the apparatus.

Fig. 2 is a top plan view of the lower cover member of the burner.

Fig. 3 is a bottom plan view of the cover member shown in Fig. 2.

Fig. 4 is a top plan view of the plate member of the apparatus.

Fig. 5 is a plan view of an end portion of the supporting arm for the burner unit.

Fig. 6 is a longitudinal sectional view through the plate and lower cover member of the burner unit with the lower portion of the shell member resting on the plate.

Fig. 7 is a plan view of another plate adapted to be used with the apparatus and which includes certain modified details of construction, and Fig. 8 is a sectional view through the plate shown in Fig. 7 with the shell attached to the lower side thereof.

Referring to the drawings more in detail the invention will now be fully described.

In Fig. 1 there is shown an oil burner apparatus which in a general way consists of a fuel reservoir R and a burner unit B which are adjustably supported by a supporting structure S.

The support S may include a base 2 and an upwardly extending member 4 secured thereto. A collar 6 may be adjustable up and down on the member 4 and a bracket member 8 has a hub as shown which is rotatable on the member 4 above the collar 6. Outwardly extending arms 10 and 12 are connected to the hub 8.

A rod 14 is fixed to and extends upwardly from the arm 10 and carries a receptacle 16 of usual form which has an open upper side. A reservoir which may be in the form of a bottle 18 is supported above the member 16 by a band 20 so that its neck portion 22 delivers fuel to the receptacle 16. The member 20 and a semi-circular guard 24 for the reservoir are suitably fixed to the member 14, as shown.

A shut-off valve device of usual form and indicated by 26 is connected by a connection 28 to the lower side of the receptacle 16 and a supply pipe 30 extends from the valve 26 to the burner unit. By manipulating the valve 26 the flow of fuel to the burner unit B is controlled.

A supporting plate 34 has upwardly and downwardly extending annular flanges 36 and 38 at the upper and lower sides thereof. The arm 12 of the bracket 8 has curving portions 40 at its outer end below the plate 34 which rests at one side on a projection or boss 41 of the arm 12. Screws 44 in threaded engagement with the extremities of the portions 40 of the arm 12 bear against the under side of the plate 34 and a clamp screw 46 passes through the arm 12 and plate 34 so that the plate may be clamped to the arm in various positions of adjustment.

The plate 34 is provided with suitable openings such as 35 to permit air to pass upwardly therethrough and into the burner unit. The burner is represented generally by 50 and may as usual consist of a plurality of concentrically disposed cylinders. The cylinders may be perforated and supported from a base 51 which may have the usual wicks associated therewith. The base and cylinders constituting the burner are supported in some suitable manner from the plate 34 as by spacers or the like. The supply pipe 30 referred to is connected to a suitable fitting 53 associated with the lower side of the burner base and the fitting may extend through the plate 34.

A lower cover member 60 has upwardly extending walls 62 which embrace the lower flange 38 of the plate and may be secured thereto by means of screws such as 63. A sump 64 is provided at the lower side of the cover member 38 which is of smaller diameter than that of the cover member so as to provide an annular substantially horizontally disposed wall 65 at the sides of the sump. On this wall, 65, there is rotatably mounted a shutter member 68. The wall 65 is provided with openings 70 in spaced relation and the shutter 68 is likewise provided with openings 72. By rotating the shutter 68 in one direction or the other the openings therein are brought into and out of register with the openings 70 of the wall 65. According to the location of the openings 72 with reference to the openings 70 more or less air passes through the cover into the burner. In that way the air supply to the burner may be adequately controlled.

A slot 74 is provided in the wall 65 of the cover 60. An operating member 76 which may be in the form of a screw is in threaded engagement with the shutter and passes through the slot 74 with its head adjacent the outer face of the wall 65 as shown. By loosening the screw 76 the shutter may be moved thereby in one direction or the other, and then the screw may be tightened to hold the shutter in adjusted position.

A bead 35' extends from the lower side of plate 34 around the openings 35 therein. Other beads 33 extend upwardly from the upper side thereof and terminate inwardly from the periphery of said openings. In case fuel oil falls onto the plate from the burner above it will be guided inwardly so as to run off the portions 34' of the plate and into the sump 64 and will not fall onto the shutter 68. A central opening 53' is provided in plate 34 for receiving a connection or support for a burner unit.

A shell 80 which is preferably cylindrical in form with relatively thin walls so that it may embrace the flange 36 of the plate is provided. Its lower end rests on the plate 34 and it extends above the plate as shown in Fig. 1 enclosing the burner cylinders, referred to.

The upper extremity of the walls of the shell 80 may be inclined inwardly as at 82 and carry a plurality of prongs or ridges 84 which extend upwardly therefrom. These prongs are adapted to support utensils of various kinds which may be set thereon and provide spaced points of support for said utensils.

It is possible, when desired, to locate the apparatus adjacent a water heating unit similar to what is known as a gas water heater and when so located the burner unit B may be swung thereunder so as to heat the coil or coils thereof. By moving the collar 6 and bracket 8 up and down on the member 4 any desired adjustment may be obtained for the burner while the swinging of the bracket on the member 4 makes it possible to accommodate the burner unit to various forms of apparatus which it may be desired to heat.

It will be seen that the burner unit is enclosed by a shell which is adapted to direct heat upwardly and prevent heat from being spread outwardly to an appreciable extent. This makes it possible to utilize the heat from the burner at the upper open side of the shell for various purposes. It will also be seen that the supply of air to the burner may be adjusted within a wide range so as to bring about the desired and most efficient combustion, the air regulation together with the fuel control facilitating adequate control of the apparatus for a wide range of uses.

The modification of the invention shown in Figs. 7 and 8 will now be described. In this form of the invention a plate 90 is provided which has an upwardly extending flange 92 for fitting inside a shell such as 80 and a lower annular flange 94 which fits inside the side wall of a lower cover member 96. A hub 98 is provided on the plate and a ring like member 100 bears on the plate 90 and is rotatable around the hub 98.

The plate is provided with perforations 102 while the plate 100 is provided with perforations 104. A hold-down 106 is secured to the hub 98 by a screw 108 and its ends overlie the ring 100 so as to prevent displacement of the member 100. An annular bead 108 may be provided on the plate around the member 100 is desired.

A slot 110 is provided in the plate 90 and a screw passes through the said slot. The screw is in threaded engagement with the member 100 and facilitates the turning and the clamping of the member 100 in various positions of adjustment. The cover member 96 may be provided with openings to allow air to pass therethrough and into the burner through the damper formed by the perforated member 100 and plate.

Having described the invention in the form at present preferred what it is desired to claim and secure by Letters Patent of the United States is:

1. A combined air casing and oil sump for an oil burner comprising in combination, a horizontally disposed plate provided with air openings therethrough, flanges extending upwardly and downwardly from said plate, a cylindrical shell having an open upper end the walls of which embrace one of said flanges, a lower cover the walls of which embrace the other flange which is provided with a central sump, a horizontal annular wall around said sump provided with openings therethrough and a shutter rotatable on said wall provided with openings therethrough and co-operating with said wall to provide an adjustable air inlet into said cover above said sump.

2. A combined air casing and oil sump for an oil burner comprising in combination, a horizontally disposed plate provided with air openings therethrough, flanges extending upwardly and downwardly from said plate, a cylindrical shell having an open upper end, the walls of which embrace one of said flanges, a lower cover having walls which embrace the other flange and which is provided with a central sump, a horizontal annular wall around said sump provided with openings therethrough, a shutter rotatable on said wall provided with openings therethrough, and means associated with said lower cover and shutter for moving the said shutter and clamping it to said horizontal wall.

3. A combined air casing and oil sump for an oil burner comprising in combination, a horizontally disposed plate provided with air openings therethrough, flanges extending upwardly and downwardly from said plate, a cylindrical shell having an open upper side the walls of which embrace one of said flanges, a lower cover having walls which embrace the other flange and is provided with a central sump, a horizontal annular wall around said sump provided with openings therethrough, and a bead on the upper side of said plate around the openings therein to guide fuel on the plate from the outer edges of the openings to points inwardly of said edges.

4. A combined air casing and oil sump for an oil burner comprising in combination, a horizontally disposed plate provided with air openings therethrough, flanges extending upwardly and downwardly from said plate, a cylindrical shell having an open upper side, the walls of which embrace one of said flanges, a lower cover having walls which embrace the other flange provided with a central sump, a horizontal annular wall around said sump provided with openings therethrough, and a shutter rotatable on said wall provided with openings therethrough, the upper ends of the walls of said shell being inclined inwardly and provided with a plurality of upwardly extending spaced utensil supporting ridges.

5. A combined air casing and oil sump for an oil burner comprising in combination, a horizontally disposed plate provided with air openings therethrough, flanges extending upwardly and downwardly from said plate, a cylindrical shell having an open upper side having walls which embrace one of said flanges, a lower cover having walls which embrace the other flange provided with a central sump, a horizontal annular wall around said sump provided with openings therethrough, and a shutter rotatable on said wall provided with openings therethrough, the air openings in said plate being arranged to provide radially disposed plate portions therebetween and beads around the periphery of said openings extending inwardly along the sides of the radial portions and terminating at a distance inside the periphery of the openings.

6. A combined air casing and oil sump for an oil burner comprising in combination, a horizontally disposed plate member having openings therethrough, flanges at upper and lower sides of said plate, a lower cover member having a side wall embracing the flanges at the lower side of the plate and an inwardly extending horizontally disposed wall member and sump disposed concentrically thereof, one of said horizontally disposed members being provided with openings therethrough and a perforated shutter member oscillatable thereon.

7. A combined air casing and oil sump for an oil burner comprising in combination, a horizontally disposed plate member having openings therethrough, flanges at upper and lower sides of said plate, a lower cover member having a side wall embracing the flanges at the lower side of the plate, an inwardly extending horizontally disposed wall member and sump disposed concentrically thereof, one of said horizontally disposed members being provided with openings therethrough and a perforated shutter member oscillatable thereon, the said side wall being provided with an opening, a member extending through the opening below the plate carrying adjusting screws abutting said plate and clamping means associated with said plate and member.

8. An air casing for an oil burner comprising in combination, a horizontally disposed plate provided with air openings therethrough, flanges extending upwardly and downwardly from said plate, a cylindrical shell having an open upper end the walls of which embrace one of said flanges, a lower cover having side walls which embrace the other flange, and a lower horizontal wall provided with openings therethrough and a shutter rotatable on said wall provided with openings therethrough and co-operating with said wall to provide an adjustable air inlet into said lower cover.

ANTONI MUSZYNSKI.
STEFAN RAPALUS.